(12) United States Patent
Chen et al.

(10) Patent No.: US 12,418,946 B2
(45) Date of Patent: Sep. 16, 2025

(54) BLUETOOTH COMMUNICATION METHOD AND ELECTRONIC DEVICE

(71) Applicant: Huawei Technologies Co., Ltd., Shenzhen (CN)

(72) Inventors: Gang Chen, Beijing (CN); Mingkun Zhang, Shenzhen (CN); Zhibin Chen, Beijing (CN); Qingbin Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 395 days.

(21) Appl. No.: 18/043,211

(22) PCT Filed: Aug. 12, 2021

(86) PCT No.: PCT/CN2021/112164
§ 371 (c)(1),
(2) Date: Feb. 27, 2023

(87) PCT Pub. No.: WO2022/042314
PCT Pub. Date: Mar. 3, 2022

(65) Prior Publication Data
US 2023/0337300 A1    Oct. 19, 2023

(30) Foreign Application Priority Data
Aug. 31, 2020   (CN) .......................... 202010899012.8

(51) Int. Cl.
*H04W 4/80*   (2018.01)
*H04W 76/14*  (2018.01)

(52) U.S. Cl.
CPC ............. *H04W 76/14* (2018.02); *H04W 4/80* (2018.02)

(58) Field of Classification Search
CPC ................................ H04W 76/14; H04W 4/80
USPC ......................................................... 455/41.2
See application file for complete search history.

(56) References Cited

U.S. PATENT DOCUMENTS

| | | | |
|---|---|---|---|
| 8,798,541 B1* | 8/2014 | Scott ................... | G06F 9/45545 |
| | | | 455/66.1 |
| 9,306,872 B2* | 4/2016 | Donaldson ............... | H04B 5/72 |
| 9,858,224 B2* | 1/2018 | Bhesania ............ | G06F 13/4221 |
| 9,906,893 B2* | 2/2018 | Zeung ................... | H04W 76/10 |
| 9,990,644 B2* | 6/2018 | Walden .............. | G06Q 30/0259 |
| 10,013,039 B2* | 7/2018 | Slavin ..................... | H04W 4/80 |
| 10,146,712 B2* | 12/2018 | Jeong ..................... | G06F 9/4411 |
| 10,165,612 B2* | 12/2018 | Zeung ................... | H04W 84/20 |
| 10,849,172 B2* | 11/2020 | Schopp ............... | H04L 63/0428 |
| 10,861,051 B2* | 12/2020 | Walden ............... | G06Q 30/0271 |
| 11,038,555 B2* | 6/2021 | Biederman ............ | A61B 5/002 |
| 11,170,409 B2* | 11/2021 | Walden .............. | G06Q 10/0833 |
| 11,426,101 B2* | 8/2022 | Biederman ............ | H01Q 11/08 |
| 2004/0162106 A1* | 8/2004 | Monroe ................ | H04W 88/06 |
| | | | 455/552.1 |

(Continued)

*Primary Examiner* — April G Gonzales
(74) *Attorney, Agent, or Firm* — Conley Rose, P.C.

(57) ABSTRACT

This application provides a Bluetooth communication method and an electronic device. The method includes: A first operating system in a first device may establish a first Bluetooth connection between the first device and a second device by using an HCI channel and a second operating system. This provides a possibility for the first operating system of the first device to perform Bluetooth communication with the second device, and helps a container of the first device to communicate with the second device.

20 Claims, 9 Drawing Sheets

(56) References Cited

U.S. PATENT DOCUMENTS

| | | | |
|---|---|---|---|
| 2009/0034498 A1* | 2/2009 | Banerjea | H04W 76/15 455/41.2 |
| 2009/0154433 A1* | 6/2009 | Jang | H04L 69/32 370/338 |
| 2010/0175067 A1* | 7/2010 | Appe | G06F 9/4881 235/375 |
| 2010/0178868 A1* | 7/2010 | Charrat | G06Q 20/3278 455/41.3 |
| 2013/0219098 A1* | 8/2013 | Turnpenny | H02J 7/02 710/303 |
| 2015/0156299 A1* | 6/2015 | Abramo | H04M 1/24 455/41.2 |

\* cited by examiner

| Operation code OpCode | | Total parameter length | Parameter 0 |
|---|---|---|---|
| Operation code command field OCF | Operation code group field OGF | | |
| ... | | | |
| Parameter N-1 | | Parameter N | |

FIG. 7

| Route identifier | PB label | BC label | Total data length |
|---|---|---|---|
| Data ||||

| Operation code OpCode | Total parameter length | Parameter 0 |
|---|---|---|
| Parameter 1 || Parameter 2 |
| ... |||
| Parameter N−1 || Parameter N |

BLUETOOTH COMMUNICATION METHOD AND ELECTRONIC DEVICE

This is a U.S. National Stage of International Patent Application No. PCT/CN2021/112164 filed on Aug. 12, 2021, which claims priority to Chinese Patent Application No. 202010899012.8 filed on Aug. 31, 2020, both of which are hereby incorporated by reference in their entireties.

TECHNICAL FIELD

This application relates to the communications field, and more specifically, to a Bluetooth communication method and an electronic device in the communications field.

BACKGROUND

When two devices communicate with each other by using Bluetooth, the two devices may specifically communicate with each other by using operating systems running on the two devices. If a first device has two different operating systems, when a second device needs to communicate with both operating systems of the first device, Bluetooth communication may be performed with only one operating system of the first device due to a limitation of Bluetooth hardware, and the second device cannot perform Bluetooth communication with the other operating system. For example, when the other operating system runs in a container or a virtual machine, the operating system in the container cannot communicate with the external second device. For example, the first device is a computer, the second device is a mobile phone, the computer runs a Linux® system, a container of the computer runs an Android system, and the mobile phone runs an Android system. In this case, the Android system of the mobile phone cannot perform Bluetooth communication with the Android system in the container of the computer.

SUMMARY

Embodiments of this application provide a Bluetooth communication method and an electronic device, so that a first operating system of a first device can perform Bluetooth communication with an operating system of a second device.

According to a first aspect, a Bluetooth communication method is provided. The method is applicable to a first device, the first device includes a first operating system and a second operating system, and the method includes: The first operating system sends a first instruction to the second operating system by using a host controller interface (host controller interface, HCI) channel, where the first instruction is used to establish a first Bluetooth connection between the first device and a second device; the second operating system establishes the first Bluetooth connection between the first device and the second device based on the first instruction; and the second operating system sends a second instruction to the first operating system by using the HCI channel, where the second instruction is used to indicate that the first Bluetooth connection is successfully established.

In the foregoing solution, the first operating system in the first device may establish the first Bluetooth connection between the first device and the second device by using the HCI channel and the second operating system, to provide a possibility for the first operating system of the first device to perform Bluetooth communication with the second device, and implement Bluetooth communication between the first operating system of the first device and the second device.

The first Bluetooth connection is used for Bluetooth communication between the first operating system and the second device.

For example, the first instruction is a first instruction group. The second instruction is a first event group.

Optionally, the HCI channel is a channel corresponding to a first HCI interface of the first operating system and an HCI layer of the second operating system.

Optionally, the first operating system is an Android system, and the second operating system is a Linux system or a Windows system.

Optionally, the first operating system runs in a container in the first device.

In some possible implementations, the method further includes: The second operating system establishes, based on the first Bluetooth connection, a data channel for transmitting data between the second operating system and the first operating system.

In some possible implementations, that the second operating system establishes, based on the first Bluetooth connection, a data channel for transmitting data between the second operating system and the first operating system includes: The second operating system determines first route identifier information corresponding to the first Bluetooth connection; the second operating system sends the first route identifier information to the first operating system by using the HCI channel; the first operating system determines first port information corresponding to the first route identifier information, where the first port information is used to identify a port in the first operating system; the first operating system sends the first port information and the first route identifier information to the second operating system through the HCI channel; and the second operating system and the first operating system establish the data channel between the second operating system and the first operating system based on the first port information.

Optionally, the second instruction may include the first route identifier information.

Optionally, the first port information is used to identify a port number or an index of a port number of a first port in the first operating system.

Optionally, the second operating system stores the first port information and the first route identifier information.

Optionally, an action performed by the second operating system may be performed by an HCI management module of the HCI layer of the second operating system.

In some possible implementations, the method further includes: The second operating system receives a first data packet that is sent by the second device by using the first Bluetooth connection; the second operating system determines the first route identifier information based on a first correspondence and the first Bluetooth connection, where the first correspondence is used to indicate that at least one piece of route identifier information is in a one-to-one correspondence with at least one Bluetooth connection, the at least one piece of route identifier information includes the first route identifier information, and the at least one Bluetooth connection includes the first Bluetooth connection;

the second operating system determines, based on a second correspondence, the first port information corresponding to the first route identifier information, where the second correspondence is used to indicate that at least one piece of route identifier information is in a one-to-one correspondence with at least one piece of port information, and the at least one piece of port information includes the first port information; and the second operating system sends the first data packet to the first operating system by using the data channel corresponding to the first port information.

Optionally, the at least one piece of port information is used to identify port numbers of different ports.

Optionally, different Bluetooth connections correspond to different route identifier information, and the second operating system may generate different route identifier information for different Bluetooth connections. The different Bluetooth connections may be Bluetooth connections between the second operating system and different devices. Different Bluetooth connections correspond to different devices. For example, the first Bluetooth connection corresponds to the second device, and the second operating system generates the first route identifier information corresponding to the first Bluetooth connection. Specifically, the second operating system may generate, based on a device identifier of the second device, the first route identifier information corresponding to the first Bluetooth connection.

In some possible implementations, the second operating system includes a Bluetooth hardware layer, a kernel layer, and an HCI layer, the first operating system includes a system layer, an application framework layer, and an application layer, and that the second operating system receives a first data packet that is sent by the second device by using the first Bluetooth connection includes:

the second operating system receives, by sequentially using the Bluetooth hardware layer, the kernel layer, and the HCI layer, the first data packet that is sent by the second device by using the first Bluetooth connection.

That the second operating system sends the first data packet to the first operating system by using the data channel corresponding to the first port information includes:

the second operating system sends the first data packet to the system layer of the first operating system by using the HCI layer; and after receiving the first data packet, the system layer of the first operating system sequentially sends the first data packet to the application framework layer and the application layer of the first operating system.

In the foregoing solution, the second operating system may receive, by sequentially using the Bluetooth hardware layer, the kernel layer, and the HCI layer, the first data packet sent by the second device. The second operating system sends the first data packet received at the HCI layer to the system layer of the first operating system. The first data packet sequentially arrives at the system layer, the application framework layer, and the application layer of the first operating system, so that a process in which the second device sends data to the first operating system can be implemented.

In some possible implementations, the method further includes: The second operating system receives a second data packet that is sent by the first operating system by using the data channel; the second operating system determines, based on the second correspondence and the first port information corresponding to the data channel, the first route identifier information corresponding to the first port information;

the second operating system determines, based on the first correspondence, the first Bluetooth connection corresponding to the first route identifier information; and the second operating system sends the second data packet to the second device by using the first Bluetooth connection.

In the foregoing solution, the second operating system may send the first data packet that is from the second device to the first operating system by using the data channel corresponding to the first port information. The first operating system may send the second data packet to the second operating system by using the data channel corresponding to the first port information, and then the second operating system sends the second data packet to the second device. In this way, a process in which the first operating system in the first device and the second device transmit Bluetooth data to each other can be implemented.

In some possible implementations, the second operating system includes the Bluetooth hardware layer, the kernel layer, and the HCI layer, the first operating system includes the application layer, the application framework layer, and the system layer, and that the second operating system receives a second data packet that is sent by the first operating system by using the data channel includes:

the first data packet of the first operating system arrives at the system layer by sequentially passing through the application layer and the application framework layer; and the first operating system sends the first data packet to the HCI layer of the second operating system by using the system layer.

That the second operating system sends the second data packet to the second device by using the first Bluetooth connection includes:

the second data packet arrives at the Bluetooth hardware layer by sequentially passing through the HCI layer and the kernel layer of the second operating system; and the second operating system sends, at the hardware layer of the second operating system, the second data packet to the second device by using the first Bluetooth connection.

In the foregoing solution, the first operating system may sequentially send the second data packet to the application layer, the application framework layer, and the system layer. The first operating system sends the second data packet to the HCI layer of the second operating system by using the system layer. The second data packet arrives at the Bluetooth hardware layer by sequentially passing through the kernel layer of the second operating system. The second operating system sends, at the Bluetooth hardware layer, the second data packet to the second device. The second device sequentially receives the second data packet at the Bluetooth hardware layer, and the second data packet sequentially passes through the kernel layer, the system layer, and the application framework layer of the second device, and arrives at the application layer.

In some possible implementations, the first operating system is the Android system, and the second operating system is the Linux® system or the Windows® system.

In some possible implementations, the first operating system is run in a container of the second operating system.

In some possible implementations, the first device is a computer, and the second device is a mobile phone. Alternatively, the first device is a tablet, and the second device is a mobile phone.

According to a second aspect, a Bluetooth communication method is provided. The method is applicable to a first device, the first device includes a first operating system and a second operating system, and the method includes: The second operating system receives a first data packet that is sent by a second device by using a first Bluetooth connection; the second operating system determines first route identifier information based on a first correspondence and the first Bluetooth connection, where the first correspondence is used to indicate that at least one piece of route identifier information is in a one-to-one correspondence with at least one Bluetooth connection, the at least one piece of route identifier information includes the first route identifier information, and the at least one Bluetooth connection includes the first Bluetooth connection; the second operating system determines, based on a second correspondence, first port information that is of a container and that corresponds to the first route identifier information, where the second correspondence is used to indicate that at least one piece of route identifier information is in a one-to-one correspondence with at least one piece of port information, and the at least one piece of port information includes the first port information; and the second operating system sends the first data packet to the first operating system by using a data channel corresponding to the first port information.

In the foregoing solution, the first device may be used as a host of the first operating system, the first device may include Bluetooth hardware, the container has no Bluetooth device, and the second operating system of the first device may determine, based on the first correspondence between the at least one piece of route identifier information and the at least one Bluetooth connection, the first route identifier information corresponding to the first Bluetooth connection. The second operating system determines the first port information based on the first route identifier information and the second correspondence between the at least one piece of route identifier information and the at least one piece of port information, and the second operating system sends the first data packet to the first operating system by using the data channel corresponding to the first port information. In other words, the second operating system may determine, by using a correspondence between the first Bluetooth connection, the first route identifier information, and the first port information, a routing direction of the first data packet that is from the second device, to make it possible for the first operating system of the first device to transmit data to the second device, and facilitate communication between the first operating system of the first device and the second device.

Optionally, the first operating system runs in the container of the first device, and the first device runs the second operating system.

Optionally, an action performed by the second operating system may be performed by an HCI management module of an HCI layer of the second operating system.

Optionally, the at least one piece of port information is used to identify port numbers of different ports. For example, the first port information is used to identify a port number of a port of the container or an index of a port number.

Optionally, different Bluetooth connections correspond to different route identifier information, and the second operating system may generate different route identifier information for different Bluetooth connections. The different Bluetooth connections may be Bluetooth connections between the second operating system and different devices. Different Bluetooth connections correspond to different devices. For example, the first Bluetooth connection corresponds to the second device, and the second operating system generates the first route identifier information corresponding to the first Bluetooth connection. Specifically, the second operating system may generate, based on a device identifier of the second device, the first route identifier information corresponding to the first Bluetooth connection.

In some possible implementations, the method further includes: The second operating system receives a second data packet that is sent by the first operating system by using the data channel; the second operating system determines, based on the second correspondence and the first port information corresponding to the data channel, the first route identifier information corresponding to the first port information; the second operating system determines, based on the first correspondence, the first Bluetooth connection corresponding to the first route identifier information; and the second operating system sends the second data packet to the second device by using the first Bluetooth connection.

In the foregoing solution, the second operating system may send the first data packet that is from the second device to the first operating system of the first device by using the data channel corresponding to the first port information. The first operating system may send the second data packet to the second operating system by using the data channel corresponding to the first port information, and then the second operating system sends the second data packet to the second device. In this way, a process in which the first operating system in the first device and the second device transmit data to each other can be implemented.

In some possible implementations, before the first data packet that is sent by the second device by using the first Bluetooth connection is received, the method further includes: The second operating system receives, by using an HCI channel, a first instruction sent by the first operating system, where the first instruction is used to establish the first Bluetooth connection between the first operating system and the second device; the second operating system establishes the first Bluetooth connection between the first operating system and the second device based on the first instruction; and the second operating system generates the first route identifier information based on the first Bluetooth connection.

In the foregoing solution, the second operating system establishes the first Bluetooth connection between the first operating system and the second device by using the first instruction that triggers establishment of the first Bluetooth connection, and the second operating system may generate the first route identifier information by using an identifier of the first Bluetooth connection, so that the first Bluetooth connection may be bound to the first route identifier information, to route data.

Optionally, the second operating system may determine the first route identifier information by using a Hand ID included in a data packet sent by using the first Bluetooth connection.

Optionally, that the second operating system establishes the first Bluetooth connection to the second device based on the first instruction includes: The second operating system establishes the first Bluetooth connection to the second device based on Bluetooth hardware in the second operating system.

Optionally, the HCI channel is generated by loading a host driver by the first operating system in the first device. For example, the host driver is Native, the Native includes a BT so file, and the first operating system may load the BT so file to generate the HCI channel. The HCI channel is a dedicated channel used to communicate with the HCI layer of the second operating system. The HCI channel may be a first HCI on a first operating system side, and the first HCI may be preset in the first operating system of the first device, or may be generated by loading a driver in real time. This is not limited in this application.

In some possible implementations, the method further includes: The second operating system sends the first route identifier information to the container through the HCI channel; the first operating system determines the first port information corresponding to the first route identifier information, where the first port information is used to identify a port in the first operating system; the first operating system sends the first port information and the first route identifier information to the second operating system through the HCI channel; and the second operating system and the first operating system establish the data channel between the second operating system and the first operating system based on the first port information.

Optionally, the second operating system may store a correspondence between the first route identifier information and the first port information.

In some possible implementations, the method further includes: The second operating system receives, through the HCI channel, a third instruction sent by the first operating system, where the third instruction is used to indicate that the data channel is successfully established. In this way, the second operating system may receive the first data packet from the second device based on the third instruction, or send the first data packet to the first operating system based on the third instruction.

In some possible implementations, the first operating system is an Android system, and a system of the second device is an Android system. In this way, Bluetooth communication between the Android system of the first device and the Android system of the second device can be implemented.

In some possible implementations, the method further includes: The second operating system may parse an instruction that is used to establish Bluetooth and that is from the second device; and if the instruction is sent to the first operating system, the instruction is sent to the first operating system through the HCI channel; or if the instruction is not sent to the first operating system, the instruction is discarded or separately processed.

In some possible implementations, the method further includes: The second operating system may parse an instruction that is from the first operating system and that is transmitted through the HCI channel; and if the instruction is sent to the second device, the instruction is sent to the second device; or if the instruction is not sent to the second device, the instruction is discarded or separately processed.

According to a third aspect, a Bluetooth communication method is provided. The method is applicable to a first device, the first device includes a first operating system and a second operating system, and the method includes: The second operating system receives a second data packet that is sent by the first operating system by using a data channel; the second operating system determines, based on a second correspondence and first port information corresponding to the data channel, first route identifier information corresponding to the first port information, where the second correspondence is used to indicate that at least one piece of route identifier information is in a one-to-one correspondence with at least one piece of port information, the at least one piece of route identifier information includes the first route identifier information, and the at least one piece of port information includes the first port information; the second operating system determines, based on a first correspondence, a first Bluetooth connection corresponding to the first route identifier information, where the first correspondence is used to indicate that at least one piece of route identifier information is in a one-to-one correspondence with at least one Bluetooth connection, and the at least one Bluetooth connection includes the first Bluetooth connection; and the second operating system sends the second data packet to a second device by using the first Bluetooth connection.

Optionally, the first operating system runs in a container of the first device.

Optionally, an action performed by the second operating system may be performed by an HCI management module of an HCI layer of the second operating system.

In some possible implementations, before the second operating system receives the second data packet that is sent by the container by using the data channel, the method further includes: The second operating system receives a first instruction that is sent by the first operating system through an HCI channel, where the first instruction is used to establish the first Bluetooth connection between the first device and the second device; the second operating system establishes the first Bluetooth connection to the second device based on the first instruction; and the second operating system generates the first route identifier information based on the first Bluetooth connection.

In some possible implementations, the method further includes: The second operating system sends the first route identifier information to the first operating system by using the HCI channel;

the second operating system receives the first route identifier information and the first port information that is of a port established in the first operating system and that is corresponding to the first route identifier information that are sent by the first operating system through the HCI channel; and the second operating system establishes, based on the first port information, the data channel for transmitting data between the second operating system and the first operating system.

In some possible implementations, the first operating system is an Android system, and the second operating system is a Linux® system or a Windows® system.

According to a fourth aspect, a Bluetooth communication apparatus is provided. The apparatus is configured to perform the method according to any one of the foregoing aspects or the possible implementations of the foregoing aspects. Specifically, the apparatus may include a module configured to perform the method according to any one of the foregoing aspects or the possible implementations of the foregoing aspects.

According to a fifth aspect, a Bluetooth communication apparatus is provided. The apparatus includes a processor, the processor is coupled to a memory, the memory is configured to store a computer program or instructions, and the processor is configured to execute the computer program or the instructions stored in the memory, so that the method in the foregoing aspects is performed.

For example, the processor is configured to execute the computer program or the instructions stored in the memory, so that the apparatus performs the method in the foregoing aspects.

According to a sixth aspect, a computer-readable storage medium is provided. The computer-readable storage medium stores a computer program (which may also be referred to as instructions or code) used to implement the method in the foregoing aspects.

For example, when the computer program is executed by a computer, the computer is enabled to perform the method in the foregoing aspects.

According to a seventh aspect, this application provides a chip. The chip includes a processor. The processor is configured to read and execute a computer program stored in a memory, to perform the method in any one of the aspects or the possible implementations of the aspects.

Optionally, the chip further includes the memory, and the memory and the processor are connected by a circuit or a wire.

Optionally, the chip further includes a communications interface.

According to an eighth aspect, this application provides a computer program product. The computer program product includes a computer program (or may be referred to as instructions or code), and when the computer program is executed by a computer, the computer is enabled to implement the method in the foregoing aspects.

BRIEF DESCRIPTION OF DRAWINGS

FIG. 7 is a schematic diagram of a format of an instruction group according to an embodiment of this application;

DESCRIPTION OF EMBODIMENTS

The following describes the technical solutions in embodiments of this application with reference to the accompanying drawings in embodiments of this application.

When a first device communicates with a second device by using Bluetooth, the two devices may specifically communicate with each other by using operating systems running on the two devices. If the first device runs a first operating system and a second operating system, the second device may perform Bluetooth communication with only one operating system of the first device due to a limitation of Bluetooth hardware, and the second device cannot perform Bluetooth communication with the other operating system. For example, the first operating system is an operating system running in a container in the first device, and the second operating system is a system provided by the first device. For example, the first operating system is an Android system, and the second operating system is a Linux® system. When the second device needs to communicate with the first operating system in the container in the first device, because the container has no Bluetooth hardware and the first operating system in the container is in a closed operating environment, the second device cannot perform Bluetooth communication with the container in the first device.

The container may be a Linux container. A resource in the container can be isolated from the first device. In addition, the container does not need to simulate a hardware device and a kernel of the first device. Performance of the container is better than performance of a virtual machine. Certainly, the container in embodiments of this application may be replaced with the virtual machine.

Figure 1:
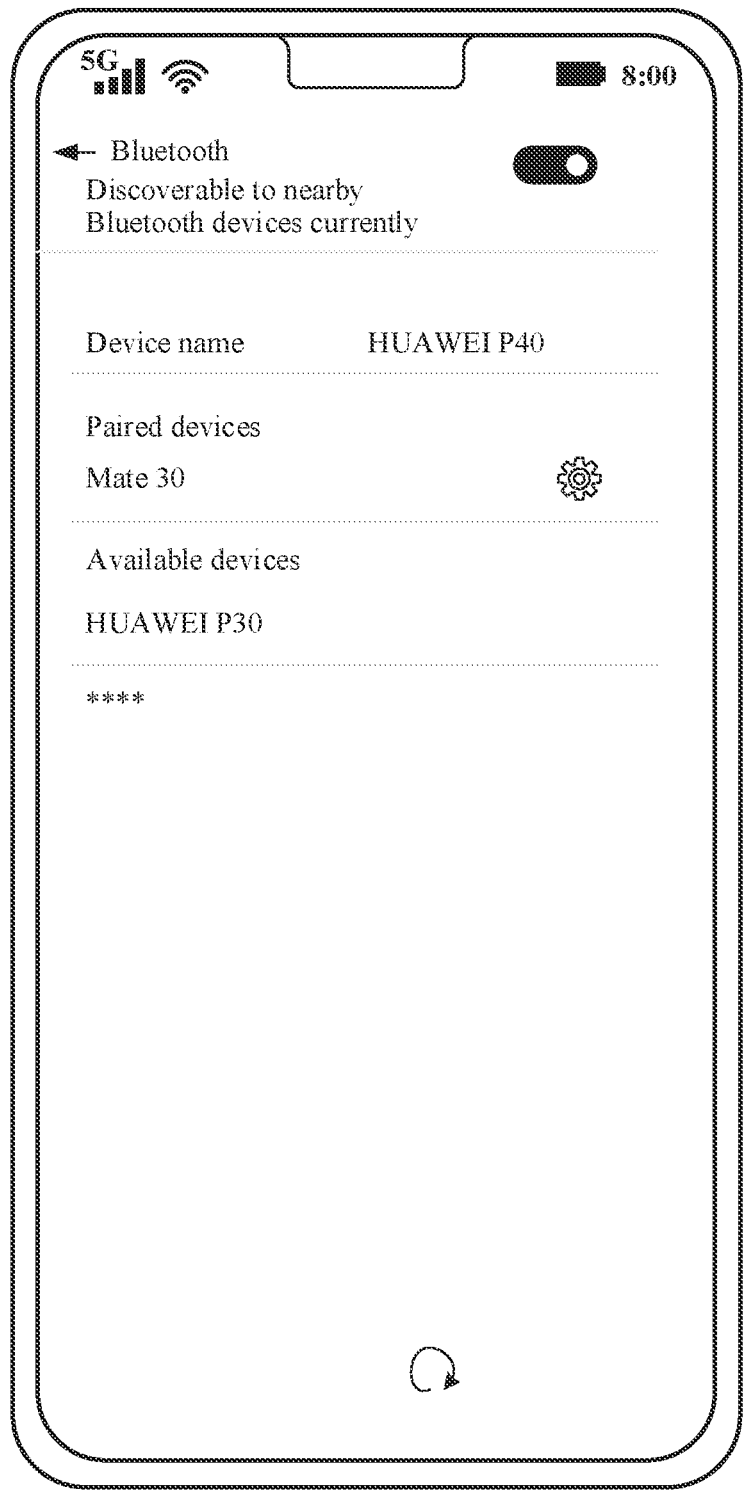
FIG. 1 is a schematic diagram of a Bluetooth search interface according to an embodiment of this application.

For example, the container in the first device and the second device may trigger communication by using an operation interface, OneHop, or the like. If communication is triggered by using the operation interface, as shown in FIG. 1, an available device list of a Bluetooth search interface of the second device does not include an identifier 1 of the container, and includes only a first device HUAWEI P30. As a result, the second device cannot discover the container, and communication between the container of the first device and the second device is abnormal.

Figure 2:
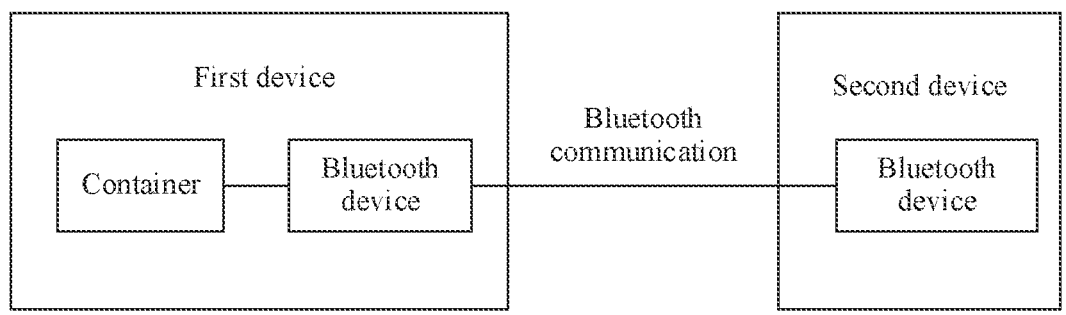
FIG. 2 is a schematic diagram of an application scenario according to an embodiment of this application.

FIG. 2 is a schematic diagram of an application scenario according to an embodiment of this application. As shown in FIG. 2, a container on a first device may communicate with a Bluetooth device of a second device by using a Bluetooth device on the first device, so that the container of the first device can communicate with the second device. Optionally, the container in FIG. 2 may also be replaced with a virtual machine.

Figure 3:
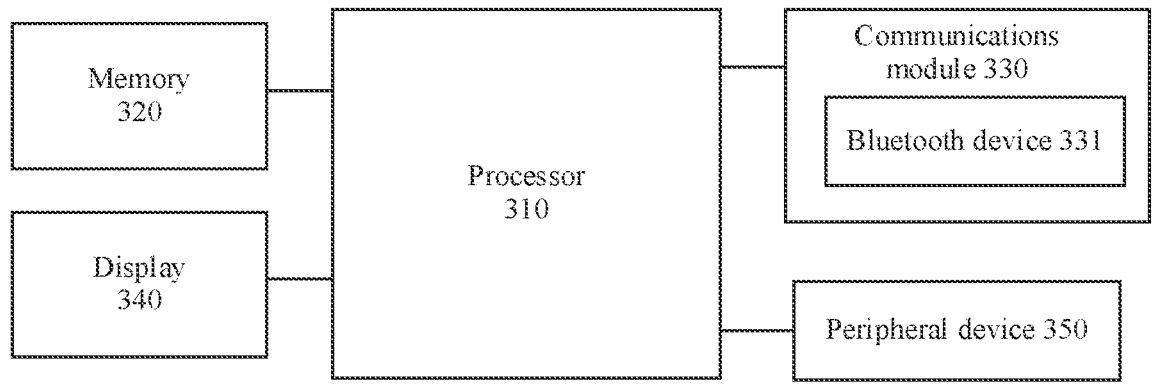
FIG. 3 is a schematic diagram of an architecture of an electronic device according to an embodiment of this application.

The first device and the second device shown in FIG. 2 each may be an electronic device 300 shown in FIG. 3. As shown in FIG. 3, the electronic device 300 may include a processor 310, a memory 320, a communications module 330, a display 340, and the like.

The processor 310 may include one or more processing units, and the memory 320 is configured to store program code and data. In this embodiment of this application, the processor 310 may execute a computer-executable instruction stored in the memory 320, to control and manage an action of the electronic device 300.

The communications module 330 may be used for communication between internal modules of the electronic device 300, communication between the electronic device 300 and another external electronic device, or the like. For example, if the electronic device 300 communicates with another electronic device in a wired connection manner, the communications module 330 may include an interface, for example, a USB interface. The USB interface may be an interface that conforms to a USB standard specification, and may be specifically a mini USB interface, a micro USB interface, a USB Type-C, interface, or the like. The USB interface may be configured to connect to a charger to charge the electronic device 300, or may be configured to transmit data between the electronic device 300 and a peripheral device, or may be configured to connect to a headset for playing audio through the headset. The interface may be further configured to connect to another electronic device such as an AR device.

Alternatively, the communications module 330 may include an audio component, a radio frequency circuit, a Bluetooth device 331, a wireless fidelity (wireless fidelity, Wi-Fi) chip, a near field communication (near-field communication, NFC) module, and the like, and may implement interaction between the electronic device 300 and another electronic device in a plurality of different manners. The Bluetooth device 331 may be a Bluetooth device of the first device or a Bluetooth device of the second device in FIG. 2.

The display 340 is configured to display an image, a video, and the like. Optionally, the electronic device 300 may further include a peripheral device 350, such as a mouse, a keyboard, a loudspeaker, or a microphone.

It should be understood that, in addition to the various components or modules listed in FIG. 3, a structure of the electronic device 300 is not specifically limited in this embodiment of this application. In some other embodiments of this application, the electronic device 300 may include more or fewer components than those shown in the figure, or combine some components, or split some components, or have different component arrangements. The components shown in the figure may be implemented by hardware, software, or a combination of software and hardware.

A software system of the electronic device 300 may use a layered architecture, an event-driven architecture, a micro kernel architecture, a micro service architecture, or a cloud architecture.

Figure 4:
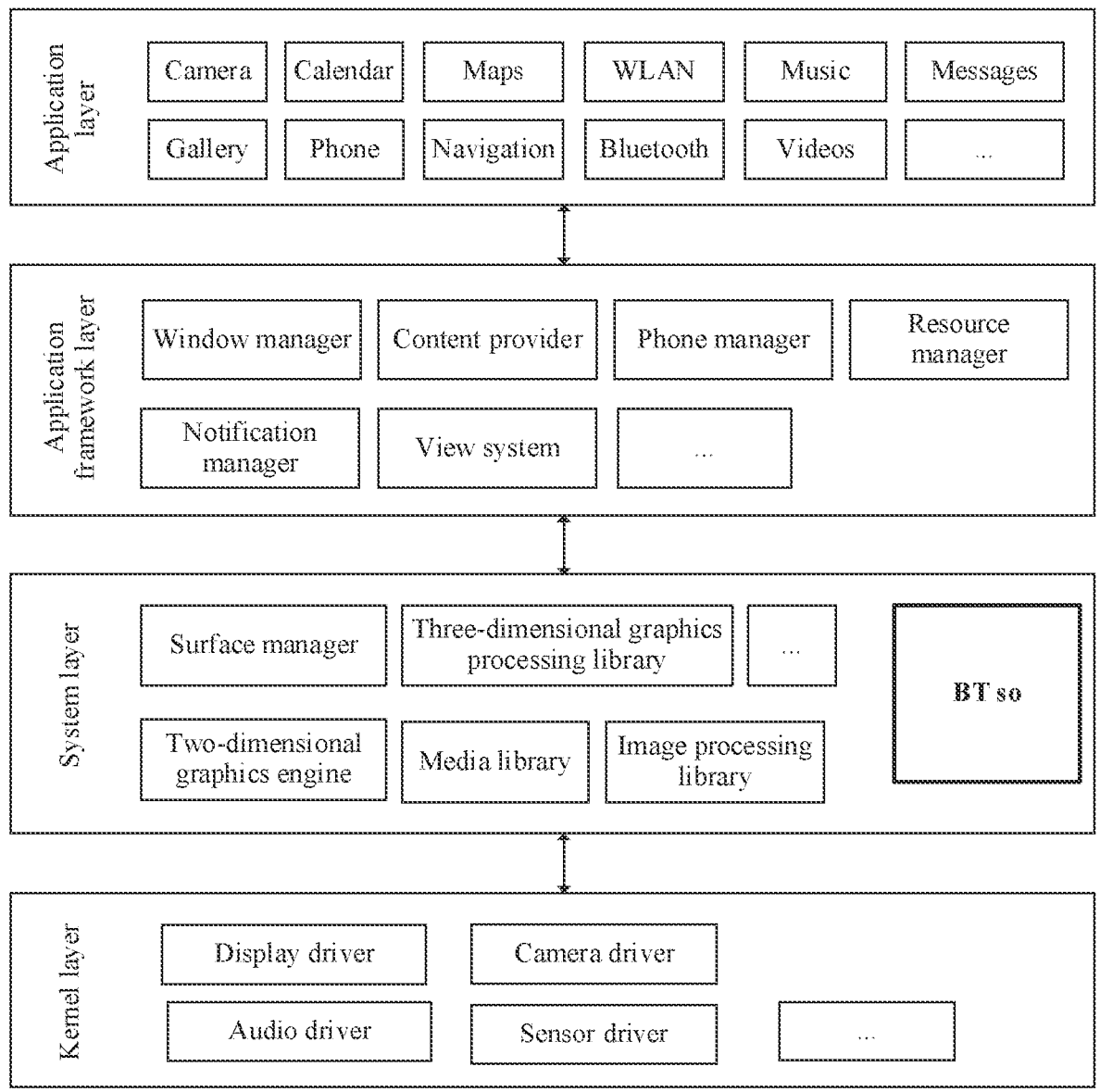
FIG. 4 is a block diagram of a software interface of an electronic device according to an embodiment of this application.

The first device may be the electronic device 300. For example, the container in the first device and the second device may have a first operating system. For example, the first operating system is an Android® system. FIG. 4 shows an example in which the Android® system with a layered architecture is used in this embodiment of this application. The container in the first device has a function similar to that of the first device, and the container may virtualize a specific function by using a module that is shown in FIG. 3 and that is of the first device. Software structures of the container in the first device and the second device are described by using an example.

FIG. 4 is a block diagram of an example of a software structure of a first operating system in a second device or a container of a first device according to an embodiment of this application. In the block diagram of the software structure, software is divided into several layers, and each layer has a clear role and task. The layers communicate with each other through a software interface. In some embodiments, the Android® system may be divided into four layers: an application layer, an application framework layer, a system layer, and a kernel layer from top to bottom.

The application layer may include a series of application packages. As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views.

For example, a display interface including an SMS message notification icon may include a text display view and an image display view.

The phone manager is configured to provide a communication function of the electronic device 300, for example, management of a call status (including answering, hanging up, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The system layer is responsible for scheduling and management of the Android system. The system layer includes Native, Native includes a Bluetooth (Bluetooth, BT) so file, and BT so is also referred to as BT vendor so. The electronic device 300 may load the BT vendor so, to generate a first HCI for communication between a system library and an HCI management module in FIG. 5.

The system layer may further include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that, in this embodiment of this application, the first device includes a first operating system and a second operating system. The first operating system and the second operating system may communicate with each other. Communication between the two operating systems may be understood as communication between corresponding modules in the two operating systems. Certainly, communication between two devices may also be understood as communication between operating systems of the two devices. In the following embodiments, an example in which the first operating system running in the container communicates with an HCI management module in the second operating system is used for description. However, this should not cause any limitation on this embodiment of this application. Communication between the container and the HCI management module may be understood as communication between the first operating system and the second operating system.

For ease of understanding, with reference to the accompanying drawings and an application scenario, a Bluetooth communication method provided in embodiments of this application is specifically described in the following embodiments of this application by using an electronic device with the structures shown in FIG. 3 and FIG. 4 as an example.

Figure 5:
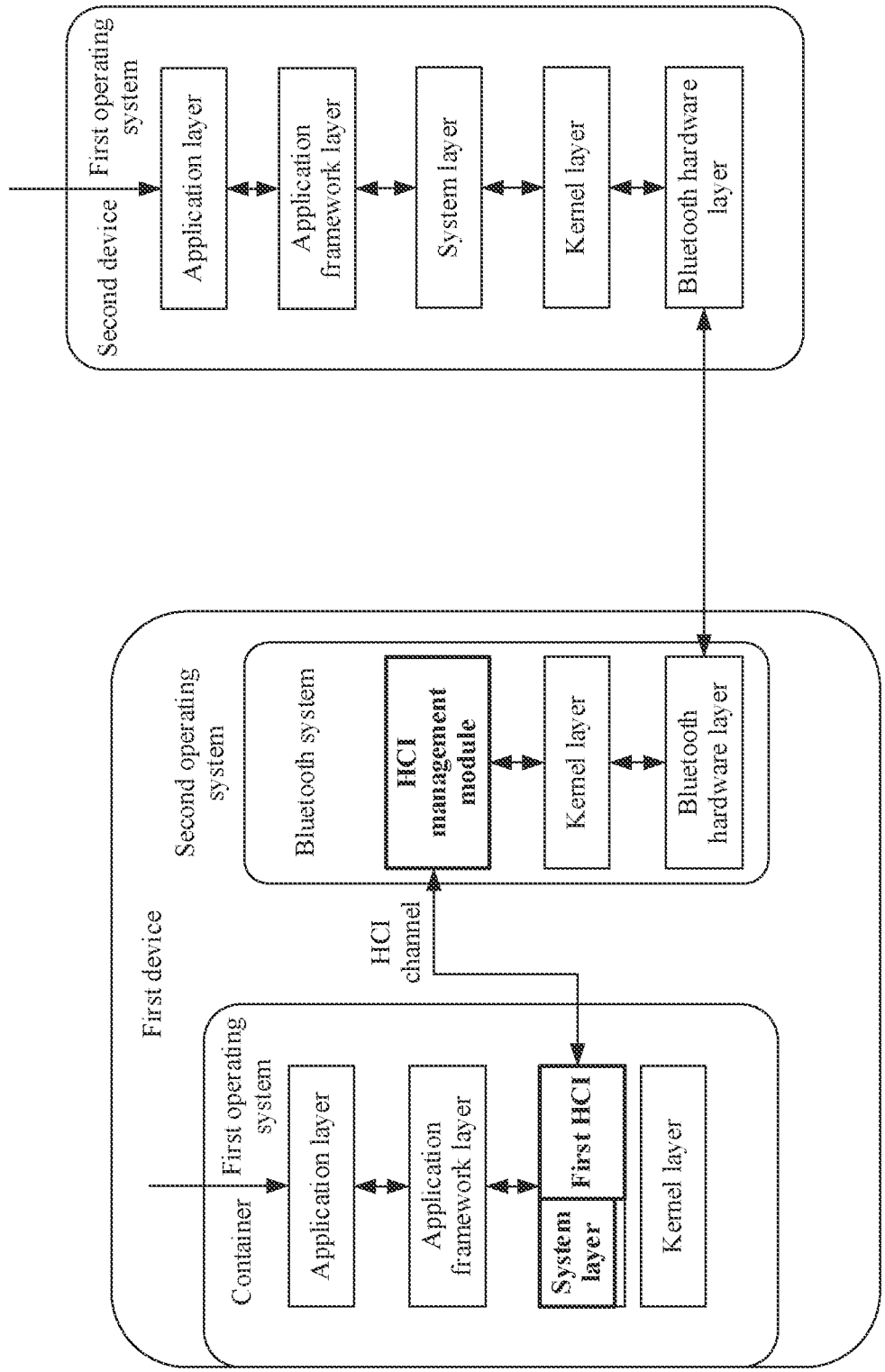
FIG. 5 is a schematic diagram of a system architecture according to an embodiment of this application.

In this embodiment of this application, to enable the container in the first device to perform Bluetooth communication with the second device, FIG. 5 is a schematic diagram of an architecture according to an embodiment of this application. In FIG. 5, the container of the first device runs the first operating system, the first device runs the second operating system, and the second device runs the first operating system. Instructions may be transmitted by using an HCI management module in a Bluetooth system. The first device is also referred to as a host (host) of the container, and the container is referred to as a guest (guest). The container in the first device may have a same first operating system as the second device, for example, an Android® system. The HCI management module and the container shown in FIG. 5 may run in the processor 310 shown in FIG. 3. The processor 310 shown in FIG. 3 may load a driver at a system layer of the container to generate a first HCI, and a channel between the first HCI interface and an HCI management module is an HCI channel. The communications module 330 shown in FIG. 3 may include the first HCI shown in FIG. 5. Specifically, with reference to FIG. 6A and FIG. 6B, the following specifically describes a Bluetooth transmission method 600 provided in an embodiment of this application.

Figure 6A:
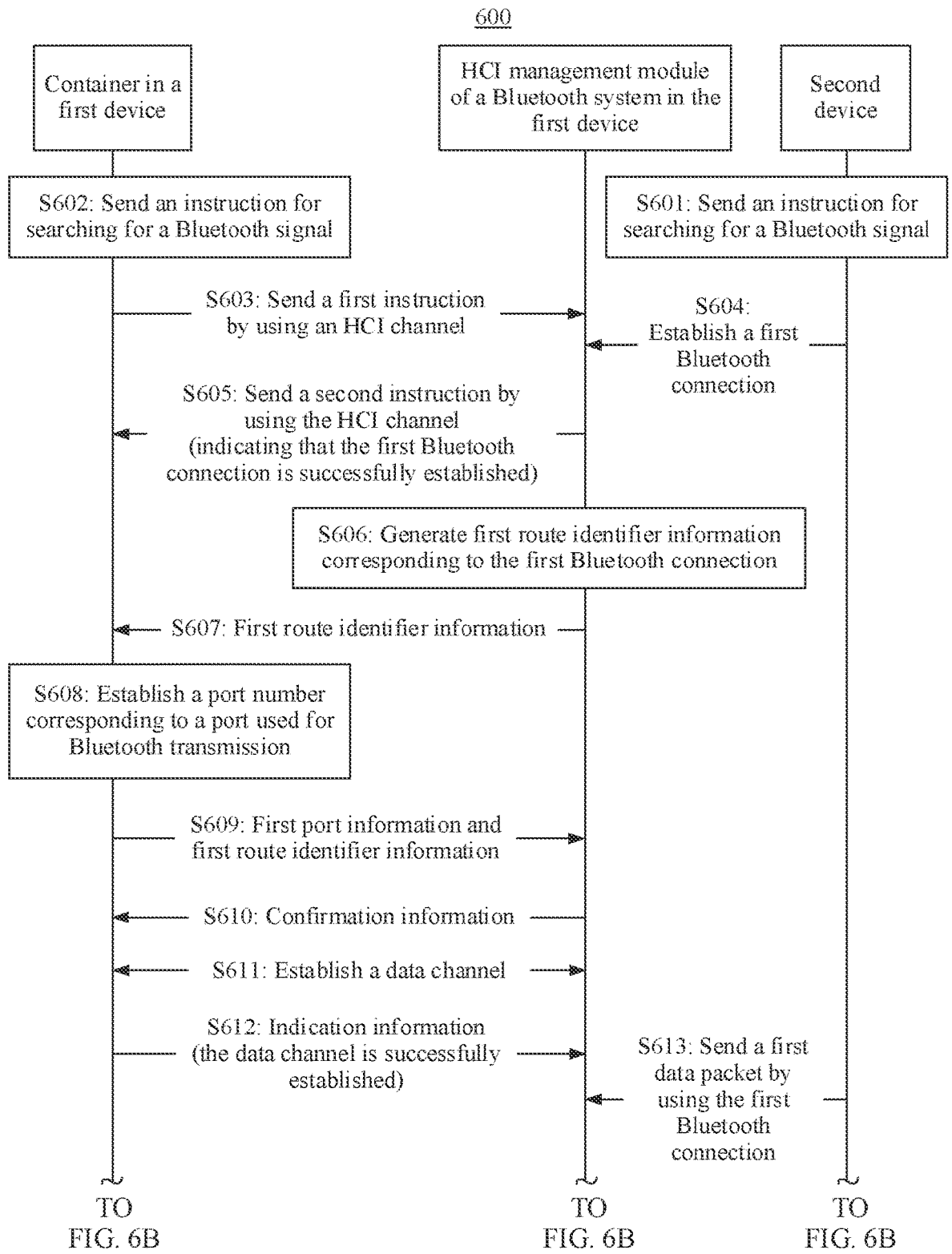
FIG. 6A and FIG. 6B are a schematic diagram of a Bluetooth communication method according to an embodiment of this application.
Figure 6B:
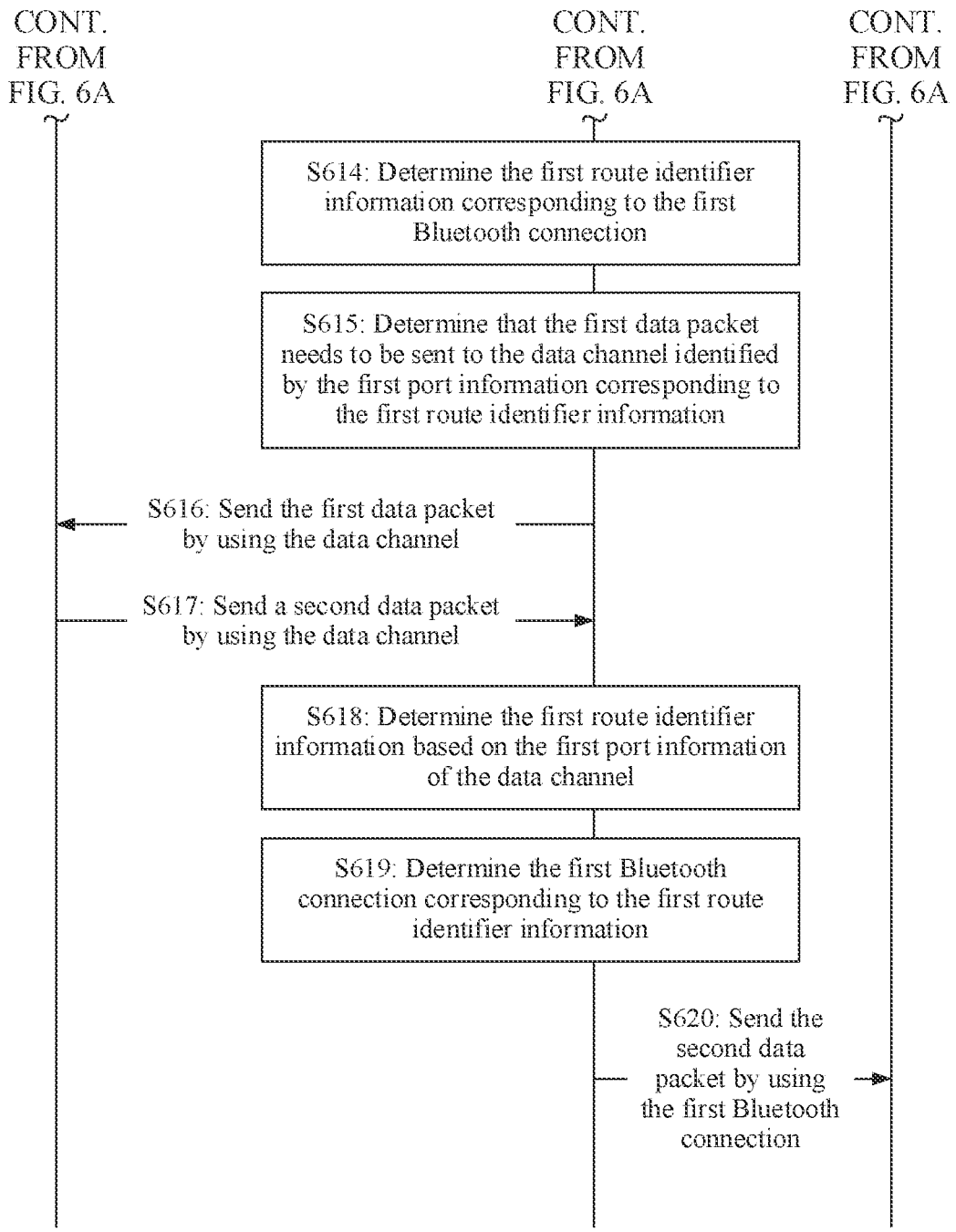

Before the method 600 is performed, a container in a first device may load a driver at a system layer. For example, the driver is BT so. Loading the BT so may generate a first HCI. The first HCI is also referred to as an HCI driver layer user space key interface. The first HCI may need to be customized. A channel between the first HCI and an HCI management module of an HCI layer of a Bluetooth system of the first device may be referred to as an HCI channel, and the HCI channel is used to transmit an instruction for establishing a Bluetooth connection. In other words, an HCI channel shown in FIG. 6A and FIG. 6B is used to communicate with the HCI layer of the Bluetooth system. For example, the container may transmit instructions to the HCI management module through the HCI channel.

S601: A second device sends an instruction for searching for a Bluetooth signal. For example, that the second device sends the instruction for searching for the Bluetooth signal may be understood as that a first operating system of the second device sends the instruction for searching for the Bluetooth signal.

Specifically, the second device may send, to an application framework layer by using an application (application) layer of the first operating system, the instruction for searching for the Bluetooth signal. The second device invokes some predefined functions related to the instruction for searching for the Bluetooth signal and the application framework layer of the first operating system, and drives a Bluetooth hardware device by using a system layer and a kernel layer of the first operating system, to wait to establish Bluetooth communication with the container in the first device.

It may be understood that, the user may trigger, based on a specific application of the second device, sending of the instruction for searching for the Bluetooth signal. For example, a user of a mobile phone triggers transferring a picture in a mobile phone that is used as the second device to the container of the first device, the user of the mobile phone may enable Bluetooth of the mobile phone used as the second device, and the mobile phone searches for a device that can be paired. Alternatively, the second device may perform OneHop with the first device, to trigger sending of the instruction for searching for the Bluetooth signal.

S602: The container of the first device sends an instruction for searching for a Bluetooth signal.

Specifically, the container of the first device sends, to the application framework layer by using the application layer of the first operating system, the instruction for searching for the Bluetooth signal. The first device invokes some predefined functions related to the instruction for searching for the Bluetooth signal and the application framework layer of the first operating system of the container, and sends the instruction for searching for the Bluetooth signal to the system layer.

It may be understood that, in S602, the user may trigger, based on a specific application in the container, the container to send the instruction for searching for the Bluetooth signal. For example, the first device may be a computer, the user may trigger a container in the computer to send a control instruction for searching for a Bluetooth signal, and the container searches for a device that can be paired. Alternatively, the first device may perform OneHop with the second device, to trigger the container in the first device to send, by using the first operating system, the instruction for searching for the Bluetooth signal.

It should be noted that a sequence of S601 and S602 is not limited, and S601 may be performed before, after, or simultaneously with S602. This is not limited in this application.

S603: After receiving, at the system layer, the instruction for searching for the Bluetooth signal, the container of the first device sends a first instruction by using the HCI channel between the first HCI and the HCI management module at the system layer, where the first instruction is used to establish a first Bluetooth connection between the first device and the second device. For example, the first instruction is used to request to establish a Bluetooth connection.

In this embodiment of this application, the first Bluetooth connection between the first device and the second device is also referred to as a Bluetooth connection between the first operating system in the first device and the second device, or a Bluetooth connection between the container of the first device and the second device.

Optionally, the first instruction may be an instruction at a Bluetooth protocol HCI layer, and is also referred to as a first instruction group. A format of the first instruction group is shown in FIG. 7. For definitions of fields such as an operation code (OpCode), an operation code group field (opcode group field, OGF), and an operation code command field (opcode command field, OCF) in FIG. 7, refer to definitions in an HCI protocol. For example, in the first instruction, an OGF is 0x37, and an OCF is 0x200, to indicate that the first instruction is used to request to establish the Bluetooth connection.

Optionally, after S603 and before S604, the method further includes: The HCI management module parses any instruction received through the HCI channel. For example, if a parsed first instruction is used to request to establish the Bluetooth connection, S604 is performed; or if an instruction parsed by the HCI management module is not used to request to establish the Bluetooth connection or is not used to perform Bluetooth pairing, but is used to change a name of the Bluetooth system of the first device, the HCI management module may discard or separately process the instruction.

It should be noted that the HCI channel between the first HCI and the HCI management module may be a bidirectional channel. To be specific, an instruction that the container may send to the HCI management module through the HCI channel is referred to as an instruction group, and an instruction that the container sends to the HCI management module through the HCI channel is referred to as an event group.

S604: After receiving the first instruction, the HCI management module of the first device establishes the first Bluetooth connection between the first device and the second device according to the first instruction.

Figure 8:
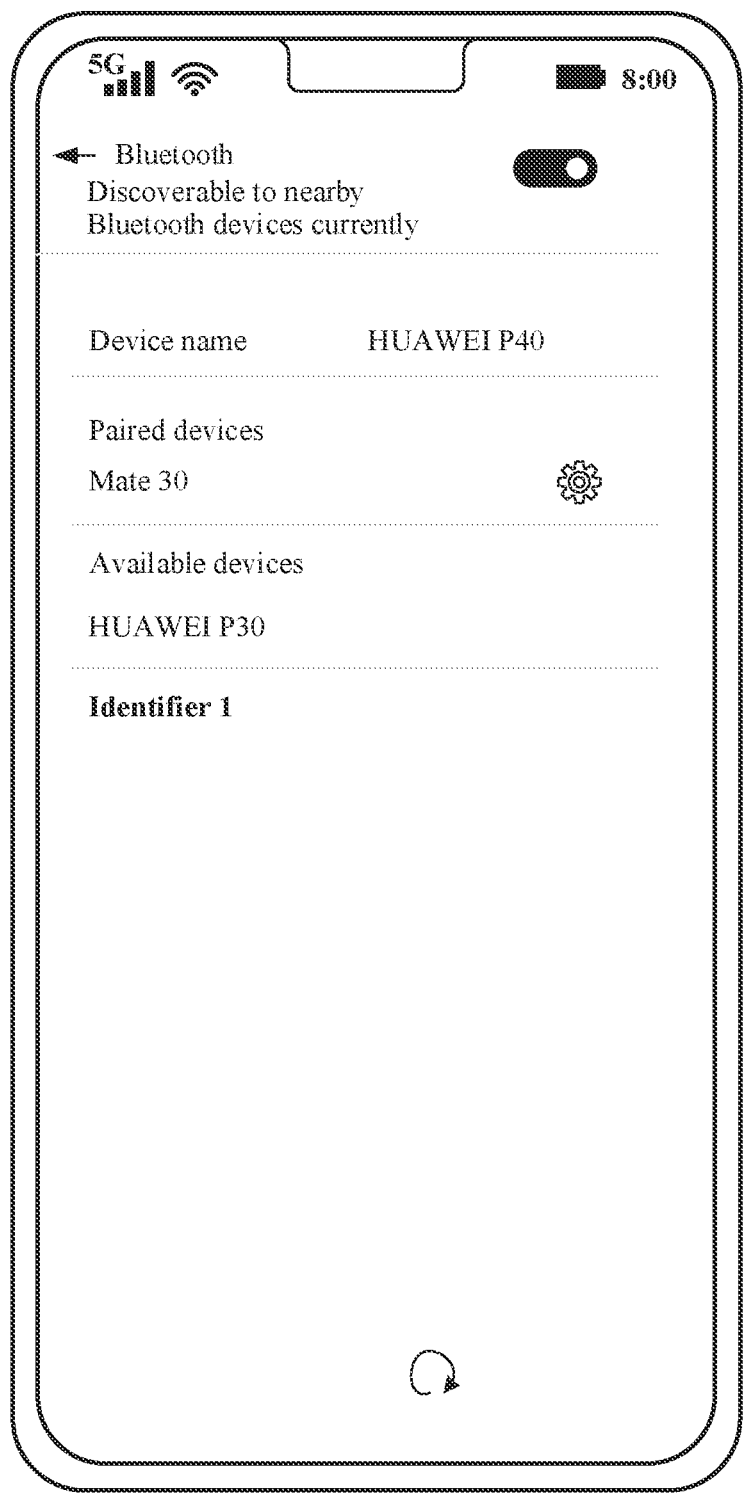
FIG. 8 is a schematic diagram of another Bluetooth search interface according to an embodiment of this application.
Figures 9, 10, 11:
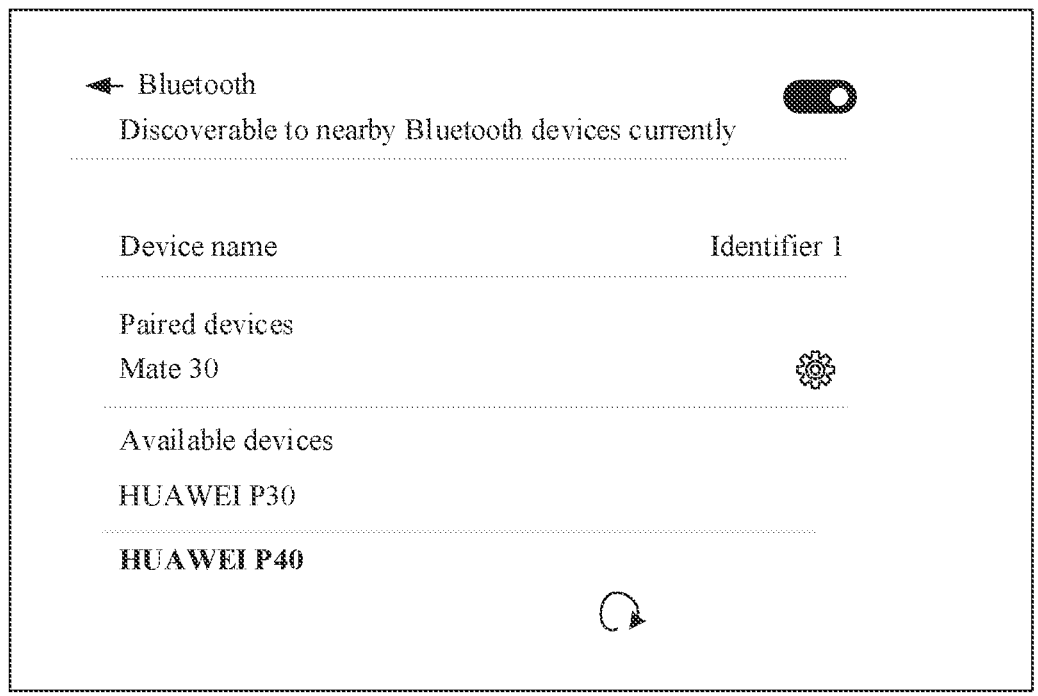
FIG. 9 is a schematic diagram of another Bluetooth search interface according to an embodiment of this application.
FIG. 10 shows a format of a data packet from a second device according to an embodiment of this application.
FIG. 11 is a schematic diagram of a format of an event group according to an embodiment of this application.

It should be noted that the container in the first device can transmit the first instruction through the HCI channel. In this way, the container in the first device and the second device may discover each other by using a Bluetooth device of the first device, so that the second device can discover the container in the first device, and the container can also discover the second device. For example, when the container in the first device and the second device can trigger Bluetooth search by using an operation interface, as shown in FIG. 8, if the second device is a mobile phone, and the first device is a computer, an identifier 1 of the container can be found in an available device on a Bluetooth interface of the second device. The second device in FIG. 8 is HUAWEI P40. Similarly, as shown in FIG. 9, in this case, the second device HUAWEI P40 can also be found in an available device on a Bluetooth interface of the container in the first device.

Optionally, the HCI management module of the first device may filter an instruction from the HCI channel of the container. If the instruction is used to establish the Bluetooth connection, the HCI management module loads a driver at the kernel layer according to the instruction, and invokes Bluetooth hardware to establish the first Bluetooth connection to Bluetooth hardware of the second device. If the instruction is not used to establish the Bluetooth connection, the instruction is discarded or processed separately. For example, if the instruction is used to change the name of the Bluetooth system of the first device, the control instruction may be discarded. In FIG. 7, if OpCode of an instruction is 0x0013, it indicates that the instruction is used to modify the name of the Bluetooth system of the first device, and the instruction is filtered and no processing is performed. For another example, if an instruction from the HCI channel indicates a system exception of the container, the instruction is filtered and no processing is performed.

Optionally, the HCI management module of the first device parses an instruction that is used to establish Bluetooth and that is from the second device. If the instruction is sent to the HCI channel between the container and the HCI management module, the instruction is sent to the first HCI of the container through the HCI channel. If the instruction is not sent to the container, the instruction is discarded or separately processed.

It should be noted that the instruction used to establish Bluetooth may be transmitted to different layers, and may be in different formats. This is not limited in this embodiment of this application.

It should be noted that the first Bluetooth connection may be understood as the Bluetooth connection between the second device and the container in the first device, or may be understood as the Bluetooth connection between the second device and the first device, and the container in the first device can perform Bluetooth communication with the second device by using the first Bluetooth connection.

Specifically, for a specific procedure of establishing the first Bluetooth connection between the second device and the HCI management module of the first device, refer to a procedure in the conventional technology. Details are not described in this application.

S605: After the HCI management module of the first device successfully establishes the first Bluetooth connection to the second device, the HCI management module sends a second instruction to the first HCI through the HCI channel, where the second instruction is used to indicate that the first Bluetooth connection is successfully established.

S606: After the HCI management module of the first device successfully establishes the first Bluetooth connection to the second device, the HCI management module generates first route identifier information corresponding to the first Bluetooth connection.

In other words, after establishing the first Bluetooth connection to the second device, the HCI management module of the first device may generate the first route identifier information for the established first Bluetooth connection. In this way, data transmitted through the first Bluetooth connection between the HCI management module of the first device and the second device needs to be routed to first port information corresponding to the first route identifier information.

Optionally, the HCI management module of the first device may generate, according to a preset rule, the first route identifier information corresponding to the first Bluetooth connection. For example, the HCI management module of the first device may generate corresponding first route identifier information based on an identifier of the first Bluetooth connection. Different Bluetooth connections correspond to different devices, and the HCI management module of the first device may generate, based on a second device identifier, the first route identifier information corresponding to the first Bluetooth connection. For another example, the HCI management module of the first device may generate the first route identifier information based on a packet header identifier of any data packet that is from the first Bluetooth connection. FIG. 10 shows a format of a data packet from the first Bluetooth connection. The first route identifier information may be generated based on a route identifier of the data packet, the route identifier may be generated by using a Handle ID, and the first 10 digits or the first 12 digits of the Handle ID may be used as the first route identifier information, or the first route identifier information may be generated through mapping based on the Handle ID according to a specific rule.

It should be noted that the HCI management module on the first device may establish one or more Bluetooth connections with a plurality of devices (for example, the second device), and the HCI management module on the first device may generate one or more pieces of different route identifier information for one or more different Bluetooth connections. In this way, the first device may store a first correspondence between one or more pieces of route identifier information and one or more Bluetooth connections. To avoid repetition, in the method 600, only the first Bluetooth connection and the first route identifier information are used as an example. For a correspondence between another Bluetooth connection and other route identifier information, refer to a correspondence between the first Bluetooth connection and the first route identifier information.

S607: The HCI management module of the first device sends the first route identifier information to the container through the HCI channel.

For example, the HCI management module may send a first event group to the container through the HCI channel, where the first event group includes the first route identifier information, as shown in FIG. 11. For meanings of fields in the first event group, refer to definitions in the HCI protocol. The first route identifier information may be first route identifier information included in any one of an event parameter 1, an event parameter 2, . . . , and an event parameter N in the event group.

Optionally, the HCI management module of the first device may use one instruction to indicate that the first Bluetooth connection is successfully established and carry the first route identifier information. In this case, the second instruction in S605 may be the first event group in S607. Certainly, the second instruction in S605 and the first event group in S607 may be two different instructions.

S608: The container of the first device establishes, based on the first route identifier information in S607, a port number corresponding to a port that is on a container side and that is used for Bluetooth transmission.

In other words, the container of the first device may establish a port number of a port used for Bluetooth transmission, and the port number corresponds to the first route identifier information.

S609: The container of the first device sends first port information and the first route identifier information to the WI management module of the first device through the HCI channel, where the first port information is used to identify the port number. Optionally, in S609, the container of the first device sends a second instruction group to the HCI management module of the first device through the HCI channel, where the second instruction group is used to request to establish a data channel, and the second instruction group further includes the first port information and the first route identifier information.

For example, the container of the first device sends the second instruction group to the HCI management module of the first device through the HCI channel. A format of the second instruction group is shown in FIG. 7. For example, in the second instruction group, an OGF is 0x37, and an Off is 0x201, to indicate that the second instruction group is used to request to establish the data channel. One or two parameters in a parameter 0, a parameter 1, . . . , and a parameter N in the second instruction group may include the first port information and the first route identifier information. If two parameters respectively include the first port information and the first route identifier information, a correspondence exists between the two parameters.

It may be understood that an instruction group used to request to establish the data channel and an instruction group including the first port information and the first route identifier information may be different instruction groups or a same instruction group (the second instruction group). This is not limited in this embodiment of this application.

S610: The HCI management module of the first device stores the correspondence between the first port information and the first route identifier information in S609, and sends confirmation information to the container through the HCI channel, where the confirmation information is used to indicate confirmation for S609.

For example, a second event group includes the confirmation information, the second event group may be a confirmation event group in the second instruction group in S609, and the second event group may indicate that the HCI management module of the first device receives the second instruction group.

It should be noted that one or more containers may exist on the first device, different containers correspond to different HCI interfaces, and the HCI management module of the first device and different HCI interfaces of the different containers correspond to different HCI channels. In this way, the HCI management module of the first device may store a second correspondence between one or more pieces of route identifier information and one or more pieces of port information. To avoid repetition, in the method 600, only the first port information and the first route identifier information are used as an example. For a correspondence between other port information and other route identifier information, refer to the correspondence between the first port information and the first route identifier information.

S611: The HCI management module of the first device establishes the data channel to the container based on the first port information.

In other words, the first port information may be used to identify the data channel established between the HCI management module of the first device and the container.

S611 may also be understood as establishing a data channel between the second operating system of the first device and the first operating system.

S612: The container of the first device sends indication information indicating that the data channel is successfully established to the HCI management module through the HCI channel.

For example, a third instruction group includes the indication information, and the HCI management module receives the third instruction group sent by the container of the first device through the HCI channel, where the third instruction group is used to indicate that the data channel is successfully established.

Specifically, in S612, the container of the first device establishes, in S608, the port number of the port used for Bluetooth transmission, and waits for the HCI management module to establish the data channel with the port corresponding to the port number. After the data channel is established, the container of the first device sends the third instruction group to the HCI management module through the HCI channel, to indicate that the data channel is successfully established. In this way, overheads caused by continuously establishing the data channel by the HCI management module can be avoided.

Optionally, a format of the third instruction group is shown in FIG. 7. For example, in the third instruction group, an OGF is 0x37, and an OCF is 0x202, to indicate that the third instruction group is used to indicate that the data channel is successfully established.

Optionally, S612 may trigger the HCI management module to perform S613 or S616. In other words, after determining that the data channel is successfully established, the HCI management module may receive a first data packet that is from the second device; or after determining that the data channel is successfully established, the HCI management module determines to send a first data packet to the first HCI of the container of the first device.

It may be understood that S612 is an optional step. The HCI management module may detect whether the data channel is successful, or attempt to send a probe data packet to the first HCI of the container to determine whether the data channel is successful. This is not limited in this embodiment of this application.

In a process in which the container of the first device performs Bluetooth communication with the second device, the container of the first device may send Bluetooth data to the second device by using the data channel established in S611, or the second device may send Bluetooth data to the container of the first device by using the data channel established in S610. For example, if the second device sends data to the container in the first device by using the data channel established in S611, S613 to S616 are performed; or if the container in the first device sends data to the second device by using the data channel established in S611, S617 to S620 are performed. If the second device sends the data to the container in the first device by using the data channel established in S611, and the container in the first device sends the data to the second device by using the data channel established in S611, S613 to S616 and S617 to S620 are performed, and a sequence of any one of S613 to S616 and any one of S617 to S620 is not limited, any step in S613 to S616 may be performed before, after, or simultaneously with any step in S617 to S620.

S613: The second device sends the first data packet to the HCI management module of the first device by using the first Bluetooth connection established in S604, and the HCI management module of the first device receives the first data packet sent by the second device by using the first Bluetooth connection established in S604.

Specifically, data in the first data packet is sequentially encapsulated at the application framework layer, the system layer, the kernel layer, and a Bluetooth hardware layer from the application layer of the second device, and can arrive at a Bluetooth hardware layer of the Bluetooth system of the first device. After receiving the first data packet, the Bluetooth hardware layer of the Bluetooth system of the first device sequentially sends the first data packet to the kernel layer, and then to the HCI management module. The first data packet may have different formats at different layers. This is not limited in this application.

Optionally, the first data packet may be data of a specific application.

S614: The HCI management module of the first device determines, based on the first Bluetooth connection and the first correspondence, the first route identifier information corresponding to the first Bluetooth connection.

In S606, the HCI management module of the first device generates the first route identifier information based on the first Bluetooth connection. Therefore, when the HCI management module of the first device receives the first data packet by using the first Bluetooth connection, the HCI management module needs to determine, in the first correspondence, the first route identifier information corresponding to the first Bluetooth connection, and the first data packet needs to be routed based on the determined first route identifier information.

S615: The HCI management module of the first device determines, based on the first route identifier information and the first port information that are stored in S610, that the first data packet that is from S612 needs to be sent to the data channel identified by the first port information corresponding to the first route identifier information, where the data channel is the data channel established in S611.

In S615, the HCI management module of the first device may determine, in the stored second correspondence between one or more pieces of route identifier information and one or more ports, the first port information corresponding to the first route identifier information, so that the first data packet that is from the second device may be sent to the data channel identified by the first port information.

S617: The HCI management module of the first device sends the first data packet that is from the second device to the system layer of the container by using the data channel determined in S615.

It should be noted that the first data packet in S613 may be sent by the second device to the HCI management module of the first device after the first Bluetooth connection is successfully established in S604 and before the data channel is established in S611. If the first data packet may be received before the HCI management module establishes the data channel with the first HCI of the container in S611, the HCI management module may first buffer the received data packet without sending the data packet, and then send the data packet by using the data channel in S617. This is not limited in this embodiment of this application.

It may be understood that, in S617, the HCI management module of the first device may transparently transmit the first data packet that is from S613 to the container by using the data channel, or may change a header of the first data packet. A modified header of the first data packet may carry an identifier of the HCI management module of the first device. In this case, the header of the first data packet in S617 may be different from a header of the first data packet in S613, and data is partially the same.

After receiving the first data packet that is from the HCI management module, the system layer of the container transfers the first data packet to the application framework layer, and then to the application layer of the container.

Optionally, after receiving the first data packet, the container displays, at the application layer of the container, that data is successfully received. After sending the first data packet to the first device, the second device returns a sending result from a lower layer to an upper layer to the application layer of the second device. For example, the application layer of the second device displays that the data is successfully sent.

S617: The first device sends a second data packet to the HCI management module of the first device by using the data channel established in S611, and the HCI management module of the first device receives, by using the data channel established in S611, the second data packet sent by the first HCI.

Specifically, the second data packet sequentially passes through the application layer of the first device, the application framework layer, and the system layer, and then is sent to the HCI management module by using the system layer of the container. The second data packet may have different encapsulation formats at different layers. This is not limited in this application.

Optionally, the second data packet may be data of a specific application.

S618: The HCI management module of the first device determines the first route identifier information based on the first port information of the data channel for receiving the second data packet.

In S618, the HCI management module of the first device may determine, in the stored second correspondence between one or more pieces of route identifier information and one or more pieces of port information, the first route identifier information corresponding to the first port information.

S619: The HCI management module of the first device determines, based on the first route identifier information, the first Bluetooth connection corresponding to the first route identifier information.

In S619, the HCI management module of the first device may determine, in the stored correspondence between one or more pieces of route identifier information and one or more Bluetooth connections, the first Bluetooth connection corresponding to the first route identifier information, so that the HCI management module may determine to send the second data packet that is from the first HCI to the first Bluetooth connection.

S620: The HCI management module of the first device sends the second data packet to the second device by using the first Bluetooth connection.

It may be understood that, in S620, the HCI management module of the first device may transparently transmit the second data packet that is from S617 to the second device, or may change a header of the second data packet. A modified header of the second data packet may carry the identifier of the HCI management module of the first device. In this case, a header of the second data packet in S617 may be different from the header of the second data packet in S620, and data is partially the same.

Specifically, the second data packet arrives at the Bluetooth hardware layer by using the kernel layer of the Bluetooth system, and is transferred from the Bluetooth hardware layer of the first device to the Bluetooth hardware layer of the second device. After the Bluetooth hardware layer of the second device receives the second data packet, the second data packet sequentially passes through the kernel layer, the system layer, and the application framework layer to arrive at the application layer. The second data packet may have different encapsulation formats at different layers. This is not limited in this application.

Optionally, after receiving the second data packet, the second device displays, at the application layer of the second device, that data is successfully received. After sending the second data packet to the second device, the HCI management module returns a sending result from a lower layer to an upper layer to the application layer of the first device. For example, the application layer of the first device displays that the data is successfully sent.

It should be noted that in this embodiment of this application, instructions transmitted between the first HCI of the container of the first device and the HCI management module may be classified into an event group and an instruction group. A control instruction sent by the HCI management module to the first HCI is referred to as the event group, and a control instruction sent by the first HCI to the HCI management module is referred to as the instruction group. In other words, a difference between the event group and the instruction group lies in different flow directions of control instructions. The container of the first device is used as a reference. The instruction group refers to a sent control instruction, and the event group refers to a received control instruction.

It should also be noted that in the method 600, S601 to S612 are a preconfiguration process, and S613 to S620 are a data packet transmission process. The container of the first device and the second device may transmit a plurality of data packets based on one configuration. In other words, S601 to S612 may be performed once, and S613 to S620 may be performed a plurality of times.

It may be understood that the method 600 may include more steps or fewer steps, and the method 600 is merely an example for description. For example, in the method 600, S601 and S602 may not exist, and the method includes only S603 to S605. In this case, an objective of the solution is to establish the first Bluetooth connection. How to trigger a process of establishing the first Bluetooth connection is not limited in this embodiment of this application. For another example, in the method 600, only S613 to S616 may exist, and no other step exists. That is, only a process in which the second device sends the first data packet to the container of the first device exists. Steps before S613 may be obtained in a historical data processing process or may be preset. For another example, in the method 600, only S617 to S620 may exist, and no other step exists. That is, only a process in which the container of the first device sends the second data, packet to the second device exists. Another step may be obtained in a historical data processing process or may be preset. For another example, in the method 600, only S613 to S620 may exist, and no other step exists. That is, only a process in which the second device sends the first data packet to the container of the first device and the container of the first device sends the second data packet to the second device exists. Steps before S613 may be obtained in a historical data processing process or may be preset.

It should be noted that, when the first data packet or the second data packet is transferred between different modules or interfaces, a specific module may change a header of a control data packet to adapt to an encapsulation format of the module, or a module may directly and transparently transmit the first data packet or the second data packet to a next node without changing a format of the first data packet or the second data packet. This is not limited in this application.

It may be understood that, in this embodiment of this application, the container may be replaced with a virtual machine. In other words, a virtual machine on the first device may share the Bluetooth system of the first device by using the first HCI, to share the Bluetooth system with the first device.

Optionally, in the foregoing embodiment, the second operating system of the first device may be a Linux® system or a Windows® system.

In this embodiment, function module division may be performed on the first device and the second device based on the foregoing method examples, or in this embodiment, function module division may be performed on the container and the HCI management module in the first device based on the foregoing method examples. For example, each function module may be obtained through division based on a corresponding function, or two or more functions may be integrated into one processing module. The foregoing integrated module may be implemented in a form of hardware. It should be noted that, in embodiments, division into modules is an example, and is merely a logical function division, During actual implementation, another division manner may be used.

It should be noted that all related content of the steps in the foregoing method embodiments may be cited in function description of corresponding functional modules. Details are not described herein again.

The first device and the second device provided in this embodiment are configured to perform the foregoing Bluetooth communication method, and therefore can achieve a same effect as the foregoing implementation method. When an integrated unit is used, the first device and the second device may separately include a processing module, a storage module, and a communications module. For example, the processing module may be configured to control and manage an action of the HCI management module and the container of the first device and the second device. For example, the processing module may be configured to support the HCI management module and the container of the first device and the second device in performing steps performed by the processing unit. The storage module may be configured to support the HCI management module and the container of the first device and the second device in executing stored program code, data, and the like. The communications module may be configured to support communication between the HCI management module and the container of the first device and the second device and another device, or configured to support communication inside a device.

The processing module may be a processor or a controller. The processor may implement or execute various example logical blocks, modules, and circuits described with reference to content disclosed in this application. The processor may be alternatively a combination for implementing a computing function, for example, a combination including one or more microprocessors or a combination of a digital signal processor (digital signal processing, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 3.

An embodiment further provides a computer-readable storage medium. The computer-readable storage medium stores computer instructions. When the computer instructions are run on an electronic device, the electronic device is enabled to perform the related method steps, to implement the Bluetooth communication method in the foregoing embodiment.

An embodiment further provides a computer program product. When the computer program product is run on a computer, the computer is enabled to perform the foregoing related steps, to implement the Bluetooth communication method in the foregoing embodiment.

In addition, an embodiment of this application further provides an apparatus. The apparatus may be specifically a chip, a component or a module, and the apparatus may include a processor and a memory that are connected to each other. The memory is configured to store computer-executable instructions. When the apparatus runs, the processor may execute the computer-executable instructions stored in the memory, so that the chip performs the secure access data method in the foregoing method embodiments.

The electronic device, the computer storage medium, the computer program product, and the chip provided in embodiments each are configured to perform the corresponding method provided above. Therefore, for beneficial effects that can be achieved by the electronic device, the computer storage medium, the computer program product, and the chip, refer to beneficial effects in the corresponding method provided above. Details are not described herein again.

Based on descriptions of the foregoing implementations, a person skilled in the art may understand that, for the purpose of convenient and brief descriptions, division into the foregoing function modules is merely used as an example for description. In actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A BLUETOOTH communication method implemented by a first device, wherein the BLUETOOTH communication method comprises:
sending, to a second operating system of the first device and using a first operating system of the first device and a host controller interface (HCI) channel, a first instruction instructing to establish a first BLUETOOTH connection between the first device and a second device;
establishing, using the second operating system and based on the first instruction, the first BLUETOOTH connection between the first device and the second device; and
sending, to the first of operating system and using the second operating system and the HCI channel, a second instruction indicating that the first BLUETOOTH connection is successfully established.

2. The BLUETOOTH communication method of claim 1, further comprising establishing, using the second operating system and based on the first BLUETOOTH connection, a data channel for transmitting data between the second operating system and the first operating system.

3. The BLUETOOTH communication method of claim 2, further comprising:
   determining, using the second operating system, first route identifier information corresponding to the first BLUETOOTH connection;
   sending, to the first operating system and using the second operating system and the HCI channel, the first route identifier information;
   determining, using the first operating system, first port information corresponding to the first route identifier information, wherein the first port information identifies a port in the first operating system;
   sending, to the second operating system and using the first operating system and the HCL channel, the first port information and the first route identifier information; and
   further establishing, based on the first port information and using the second operating system and the first operating system, the data channel.

4. The BLUETOOTH communication method of claim 3, further comprising:
   receiving, from the second device and using the second operating system and the first BLUETOOTH connection, a first data packet;
   determining, using the second operating system and based on a first correspondence and the first BLUETOOTH connection, the first route identifier information, wherein the first correspondence indicates that at least one piece of route identifier information is in a first one-to-one correspondence with at least one BLUETOOTH connection, wherein the at least one piece of route identifier information comprises the first route identifier information, and wherein the at least one BLUETOOTH connection comprises the first BLUETOOTH connection;
   determining, using the second operating system and based on a second correspondence, the first port information, wherein the second correspondence indicates that the at least one piece of route identifier information is in a second one-to-one correspondence with at least one piece of port information, and wherein the at least one piece of port information comprises the first port information; and
   sending, to the first operating system and using the second operating system and the data channel, the first data packet.

5. The BLUETOOTH communication method of claim 4, further comprising:
   further receiving, using the second operating system by sequentially using a BLUETOOTH hardware layer of the second operating system, a kernel layer of the second operating system, and an HCI layer of the second operating system, the first data packet;
   sending, to a system layer of the first operating system and using the second operating system and the HCI layer, the first data packet; and
   sequentially sending, using the system layer, to an application framework layer of the first operating system and an application layer of the first operating system, and after receiving the first data packet, the first data packet.

6. The BLUETOOTH communication method of claim 2, further comprising:
   receiving, from the first operating system and using the second operating system and the data channel, a data packet;
   determining, using the second operating system and based on a second correspondence and first port information corresponding to the data channel first route identifier information corresponding to the first port information, wherein the second correspondence indicates that at least one piece of route identifier information is in a first one-to-one correspondence with at least one piece of port information, wherein the at least one piece of port information comprises the first port information and wherein the first port information identifies a port in the first operating system;
   determining, using the second operating system and based on a first correspondence, the first BLUETOOTH connection corresponding to the first route identifier information, wherein the first correspondence indicates that the at least one piece of route identifier information is in a second one-to-one correspondence with at least one BLUETOOTH connection, wherein the at least one piece of route identifier information comprises the first route identifier information, and wherein the at least one BLUETOOTH connection comprises the first BLUETOOTH connection; and
   sending, using the second operating system and the first BLUETOOTH connection, the data packet to the second device.

7. The BLUETOOTH communication method of claim 6, further comprising:
   receiving, from the first operating system, at a system layer of the first operating system by sequentially passing through an application layer of the first operating system and an application framework layer of the first operating system, the data packet;
   sending, to an HCI layer of the second operating system and using the first operating system and the system layer, the data packet;
   receiving, at a BLUETOOTH hardware layer of the second operating system by sequentially passing through the HCI layer and a kernel layer of the second operating system, the data packet; and
   sending, using the second operating system and the first BLUETOOTH connection, at the BLUETOOTH hardware layer, and to the second device, the data packet.

8. The BLUETOOTH communication method of claim 1, wherein the HCI channel corresponds to an HCI interface of a system layer of the first operating system and an HCI layer of the second operating system.

9. The BLUETOOTH communication method of claim 1, further comprising running, using a container of the second operating system, the first operating system.

10. A first device comprising:
    a memory configured to store:
       instructions;
       a first operating system; and
       a second operating system; and
    a processor coupled to the memory and configured to execute instructions to cause the first device to:
       send, to the second operating system and using the first operating system and a host controller interface (HCI) channel, a first instruction instructing to establish a first BLUETOOTH connection between the first device and a second device;

establish, using the second operating system and based on the first instruction, the first BLUETOOTH connection between the first device and the second device; and send, to the first operating system and using the second operating system and the HCI channel, a second instruction indicating that the first BLUETOOTH connection is successfully established.

11. The first device of claim 10, wherein the processor is further configured to execute the instructions to cause the first device to:

determine, using the second operating system, first route identifier information corresponding to the first BLUETOOTH connection;

send, to the first operating system and using the second operating system and the HCI channel, the first route identifier information;

determine, using the first operating system, first port information corresponding to the first route identifier information, wherein the first port information identify identifies a port in the first operating system;

send, to the second operating system and using the first operating system and the HCI channel, the first port information and the first route identifier; and further establish, based on the first port information and using the second operating system and the first operating system, the data channel.

12. The first device of claim 11, wherein the processor is further configured to execute the instructions to cause the first device to:

receive, from the second device and using the second operating system and the first BLUETOOTH connection, a first data packet;

determine, using the second operating system and based on a first correspondence and the first BLUETOOTH connection, first route identifier information, wherein the first correspondence indicates that at least one piece of route identifier information is in a first one-to-one correspondence with at least one BLUETOOTH connection, wherein the at least one piece of route identifier information comprises the first route identifier information, and wherein the at least one BLUETOOTH connection comprises the first BLUETOOTH connection;

determine, using the second operating system and based on a second correspondence, first port information corresponding to the first route identifier information, wherein the second correspondence indicates that the at least one piece of route identifier information is in a second one-to-one correspondence with at least one piece of port information, and wherein the at least one piece of port information comprises the first port information; and sending, to the first operating system and using the second operating system and the data channel, the first data packet.

13. The first device of claim 12, wherein the second operating system comprises a BLUETOOTH hardware layer, a kernel layer, and an HCI layer, wherein the first operating system comprises a system layer, an application framework layer, and an application layer, and wherein the processor is further configured to execute the instructions to cause the first device to:

receive, from the second device and using the first BLUETOOTH connection and the second operating system by sequentially using the BLUETOOTH hardware layer, the kernel layer, and the HCI layer, the first data packet;

send, to the system layer and using the second operating system and the HCI layer, the first data packet; and sequentially send, using the system layer, to the application framework layer and the application layer, and after receiving the first data packet, the first data packet.

14. The first device of claim 11, wherein the processor is further configured to execute the instructions to cause the electronic device to:

receive, from the first operating system and using the second operating system and the data channel, a data packet;

determine, using the second operating system and based on a second correspondence and first port information corresponding to the data channel, first route identifier information corresponding to the first port information, wherein the second correspondence indicates that at least one piece of route identifier information is in a first one-to-one correspondence with at least one piece of port information, wherein the at least one piece of port information comprises the first port information, and wherein the first port information identifies a port in the first operating system;

determine, using the second operating system and based on a first correspondence, the first BLUETOOTH connection corresponding to the first route identifier information, wherein the first correspondence indicates that the at least one piece of route identifier information is in a second one-to-one correspondence with at least one BLUETOOTH connection, wherein the at least one piece of route identifier information comprises the first route identifier information, and wherein the at least one BLUETOOTH connection comprises the first BLUETOOTH connection; and send, to the second device and using the second operating system and the first BLUETOOTH connection, the data packet.

15. The first device of claim 14, wherein the second operating system comprises a BLUETOOTH hardware layer, a kernel layer, and an HCI layer, wherein the first operating system comprises an application layer, an application framework layer, and a system layer, and wherein the processor is further configured to execute the instructions to cause the electronic device to:

receive, from the first operating system and at the system layer by sequentially passing through the application layer and the application framework layer, the data packet;

send, to the HCI layer and using the first operating system and the system layer, the data packet;

receive, at the BLUETOOTH hardware layer by sequentially passing through the HCI layer and the kernel layer, the data packet; and send, to the second device and using the first BLUETOOTH connection and the second operating system at the hardware layer, the data packet.

16. The first device of claim 10, wherein the HCI channel corresponds to a first HCI interface of a system layer of the first operating system and an HCI layer of the second operating system.

17. The first device of claim 10, wherein the processor is further configured to execute the instructions to cause the first device to run, using a container of the second operating system, the first operating system.

18. A computer program product comprising computer-executable instructions that are stored on a non-transitory computer-readable medium and that, when executed by a processor, cause a first device to:
- send, using a first operating system of the first device and a host controller interface (HCI) channel and to a second operating system of the first device, a first instruction instructing to establish a first BLUETOOTH connection between the first device and a second device;
- establish, using the second operating system and based on the first instruction, the first BLUETOOTH connection between the first device and the second device; and
- send, using the second operating system and the HCI channel and to the first operating system, a second instruction indicating that the first BLUETOOTH connection is successfully established.

19. The computer program product of claim 18, wherein the computer-executable instructions further cause the first device to establish, using the second operating system and based on the first BLUETOOTH connection, a data channel for transmitting data between the second operating system and the first operating system.

20. The computer program product of claim 19, wherein the computer-executable instructions further cause the first device to:
- determine, using the second operating system, first route identifier information corresponding to the first BLUETOOTH connection;
- send, using the second operating system and the HCI channel and to the first operating system, the first route identifier information;
- determine, using the first operating system, first port information corresponding to the first route identifier information, wherein the first port information identifies a port in the first operating system;
- send, using the first operating system and the HCI channel and to the second operating system, the first port information and the first route identifier information; and
- further establish, using the second operating system and the first operating system and based on the first port information, the data channel.

* * * * *

UNITED STATES PATENT AND TRADEMARK OFFICE
CERTIFICATE OF CORRECTION

| | | |
|---|---|---|
| PATENT NO. | : 12,418,946 B2 | Page 1 of 1 |
| APPLICATION NO. | : 18/043211 | |
| DATED | : September 16, 2025 | |
| INVENTOR(S) | : Gang Chen et al. | |

It is certified that error appears in the above-identified patent and that said Letters Patent is hereby corrected as shown below:

In the Claims

Claim 11, Column 27, Line 21: "information, wherein the first port information identify" should read "information, wherein the first port information"

Claim 11, Column 27, Line 25: "information and the first route identifier; and" should read "information and the first route identifier information; and"

Signed and Sealed this
Twenty-first Day of October, 2025

John A. Squires
*Director of the United States Patent and Trademark Office*